United States Patent [19]

Noren et al.

[11] Patent Number: 4,520,144

[45] Date of Patent: May 28, 1985

[54] POLYDIMETHYLSILOXANE-MODIFIED POLYEPOXIDES

[75] Inventors: Gerry K. Noren, Hoffman Estates; Mary F. Clifton, Woodstock, both of Ill.

[73] Assignee: DeSoto, Inc., Des Plaines, Ill.

[21] Appl. No.: 577,553

[22] Filed: Feb. 6, 1984

[51] Int. Cl.³ ........................ C08L 63/02; C08L 83/08
[52] U.S. Cl. ..................................... 523/435; 523/455; 428/418; 525/454; 525/476; 525/528
[58] Field of Search ............... 525/454, 476, 528, 474; 528/78; 523/435

[56] References Cited

U.S. PATENT DOCUMENTS

| | | | |
|---|---|---|---|
| 2,527,590 | 10/1950 | Speier | 528/28 |
| 2,931,786 | 4/1960 | Clark et al. | 525/474 |
| 3,179,622 | 4/1965 | Haluska | 528/28 |
| 3,636,133 | 1/1972 | Hawkins | 525/474 |
| 3,660,523 | 5/1972 | Grawe et al. | 525/454 |

Primary Examiner—Wilbert J. Briggs, Sr.
Attorney, Agent, or Firm—Dressler, Goldsmith, Shore, Sutker & Milnamow, Ltd.

[57] ABSTRACT

A modified polyepoxide is disclosed which cures with an amine-functional curing agent at room temperature to form coatings having better flexibility and resistance to Skydrol hydraulic fluid. This modified polyepoxide is the reaction product of a diurethane diisocyanate with a resinous polyepoxide having a molecular weight of from about 500 to about 1000 and a 1,2-epoxy equivalency of from about 1.5 to about 2.0. The diurethane diisocyanate is reacted with the resinous polyepoxide in an amount of from about 1.5 moles to about 16 moles per 100 moles of the polyepoxide. The diurethane diisocyanate is itself the reaction product of a dicarbinol-terminated polydimethyl polysiloxane having a molecular weight of from about 1000 to about 4000 with substantially a 2:1 stoichiometric excess of an organic diisocyanate.

7 Claims, No Drawings

POLYDIMETHYLSILOXANE-MODIFIED POLYEPOXIDES

DESCRIPTION

1. Technical Field

This invention relates to polyepoxide coating compositions which are cured under ambient conditions with amine-functional curing agents and which exhibit improved flexibility and resistance to Skydrol fluid (a phosphate ester-based hydraulic fluid) so as to better perform as a primer for the coating of aluminum substrates used in the aircraft industry.

2. Background Art

The coating of aluminum substrates used in the aircraft industry requires a coating composition which will cure to provide the desired characteristics at room temperature. Polyepoxide coatings cured with amine-functional curing agents are well known for this purpose. These prior art coatings have lacked desired flexibility and when modified to improve the flexibility, the needed resistance to the Skydrol fluid used in the aircraft industry has become inadequate. The object of this invention is to provide primers for the aluminum substrates used in the aircraft industry, which combine good flexibility with good resistance to Skydrol fluid.

DISCLOSURE OF INVENTION

In accordance with this invention, a modified polyepoxide is provided by reacting a diurethane diisocyanate with a resinous hydroxy-functional polyepoxide having a molecular weight of from about 500 to about 1000 and a 1,2-epoxy equivalency of from about 1.5 to about 2.0. The diurethane diisocyanate is reacted with the resinous polyepoxide in an amount of from about 1.5 moles to about 16 moles per 100 moles of the polyepoxide.

The diurethane diisocyanate just referred to is itself the reaction product of a dicarbinol-terminated polydimethyl polysiloxane having a molecular weight of from about 1000 to about 4000 with substantially a 2:1 stoichiometric excess of an organic diisocyanate. These diurethane diisocyanates are themselves known products taught in the art to be useful in radiation-curable coatings after further reaction with a monoethylenic monomer containing a single reactive hydrogen atom, such as 2-hydroxyethyl acrylate.

The invention includes the modified polyepoxide reaction products described above in combination with a stoichiometric proportion of amine-functional curing agent, as will be discussed hereinafter. These combinations, being slowly curable at room temperature, are mixed together shortly prior to application. To provide coating viscosity, an inert organic solvent, such as methyl ethyl ketone, butyl acetate or 2-ethoxy ethyl acetate, is used.

The reaction which takes place to form the modified polyepoxide is between the isocyanate groups of the diurethane diisocyanate, and some of the hydroxy groups contained in the aforesaid resinous polyepoxide. Since there is a large excess of hydroxy functionality in the resinous polyepoxide compared with the isocyanate functionality in the diurethane diisocyanate, a large amount of the resinous polyepoxide remains unreacted in the mixture which is formed.

The modified polyepoxide product of the invention, when compounded for coating purposes and cured in film form with the conventional amine-functional curing agents normally used to cure the unmodified polyepoxide coatings of the prior art, results in an increase in the flexibility of the cured film, as indicated by improved resistance to reverse impact. This marked increase in impact resistance is in excess of what would be expected with a small decrease in the hardness of the cured film. Thus, the film can be softened by including a plasticizer in the coating composition, but then very little flexibility improvement is observed. The desirable resistance to Skydrol fluid possessed by cured coatings containing the unmodified polyepoxide is retained when the modified polyepoxides are used.

The organic diisocyanates which are used to react with the carbinol groups of the previously described polysiloxanes is subject to wide variation. Methylene dianiline diisocyanate, isophorone diisocyanate and toluene diisocyanate are all useful herein.

The polysiloxanes previously described and used in the invention contain two terminal carbinol groups, one at each end. The carbinol group is the —$CH_2OH$ group. The molecular weights of these polysiloxanes is the only variable in this narrow class of compounds, and it is important because excess molecular weight leads to a reduction in Skydrol resistance. On the other hand, too little molecular weight provides inadequate flexibility. The preferred polysiloxanes have a molecular weight of about 2200 to about 2500, and a commercial product having a molecular weight range of from 2290 to 2400 will be used in the examples. Any molecular weight within the disclosed range can be used, it being understood that the selection merely balances desired Skydrol resistance with desired flexibility. Corresponding dicarbinol polysiloxanes having a molecular weight of about 1500 and about 3000 will further illustrate usuable products.

The polyepoxides which are used herein are preferably diglycidyl ethers of a bisphenol having the molecular weights noted previously. The usual bisphenol is bisphenol A. The preferred polyepoxide for use in this invention is Epon 836 obtainable from Shell Chemical Company. This product is a diglycidyl ether of bisphenol A having an epoxide equivalent weight ranging from 290–335. Other diglycidyl ethers of bisphenol A having a molecular weight of about 550 and about 900 will further illustrate the useful compounds. As is known, one can take a diglycidyl ether of bisphenol A having a molecular weight of about 400 and increase the molecular weight to any level desired by reaction with an appropriate proportion of bisphenol A.

It should be appreciated that the higher the molecular weight of the polyepoxide, the easier it is to produce an undesired gel. Higher molecular weight is partially responsible for this, and the higher hydroxy functionality possessed by such products is primarily responsible. This is why the molecular weight of the polyepoxide and the proportion of reactants are both important. The preferred molecular weight of the polyepoxide is from about 600 to about 800, and the preferred proportions are from about 3 moles to about 10 moles of diisocyanate per 100 moles of the polyepoxide.

The amine-functional curing agents are known per se, and 2-aminoethyl 3-aminopropyl trimethoxy silane will be used herein as illustrative since this is the usual curing agent used in the aircraft industry. Dow Corning product Z-6020 may be used. These amine-functional curing agents are used in approximately an equivalent proportion based on amino hydrogen in the curing agent and oxirane functionality in the polyepoxide.

The reaction between the amine curing agent and the polyepoxide component is normally speeded by the presence of a catalyst which is usually a tertiary amine. A suitable tertiary amine catalyst is illustrated in the examples, but catalyst selection is conventional herein and forms no part of this invention.

To understand the extent of improvement, using Epon 836 with 0% modification, the hardness obtained in the cured film is H-2H, but the reverse impact resistance is less than 10 inch-pounds. In contrast, a 6% modification (6 moles of diurethane diisocyanate of this invention per 100 moles of Epon 836) provides a reverse impact resistance of 80 inch-pounds with a hardness reduction of only 2 units (HB-F). These results are obtained by coating an aluminum panel (Alclad 2024-T3) with coatings of the type shown in the examples having a thickness of 1–1.5 mil which is cured at room temperature for 10 days. The coatings are applied in solution at 65% resin solids content using butyl acetate as the solvent.

Throughout this application, including the examples and claims which follow, all parts are by weight, unless otherwise specified.

The invention is illustrated in the Examples which follow.

EXAMPLE 1

2 moles of isophorone diisocyanate are reacted with one mole of a dicarbinol-terminated polydimethyl polysiloxane having a molecular weight range of from 2290 to 2400 (the Dow Corning product Q4-3667 may be used). The reaction is carried out at 70% solids in methyl ethyl ketone. No catalyst is needed, and the reaction is carried out at room temperature for 2 hours. At the end of this time, the product is a low viscosity liquid containing 14% by weight of isocyanate functionality.

EXAMPLE 2

0.6491 mole of Epon 836 is warmed to 90° C. in admixture with sufficient butyl acetate to provide a solution containing 65% solids. This solution at 90° C. has added thereto over a 1 hour period, 0.01052 mole of the Example 1 product. This reaction mixture is maintained at 90° C. for 2 hours to permit the isocyanate functionality to react. At the end of this period, no measurable isocyanate functionality was detectable.

EXAMPLE 3

7.5 grams of the reaction product of Example 2 are mixed with 0.7 gram of 2-aminoethyl 3-aminopropyl trimethoxy silane (Dow Corning product Z-6020 may be used) and 8% (of total nonvolatile solids) of a tertiary amino phenol (DMP-30). This catalyst has the chemical name 2,4,6-tris dimethylaminomethyl phenol.

The mixture of reactants specified above is unstable, but it has a pot life of several hours during which it can be used for coating application, as by air spray or other typical coating method. The composition was coated on aluminum panels and cured at room temperature, as described previously, to provide the characteristics previously set forth in the comparative description.

What is claimed is:

1. A modified polyepoxide reaction product of a diurethane diisocyanate with a resinous polyepoxide having a molecular weight of from about 500 to about 1000 and a 1,2-epoxy equivalency of from about 1.5 to about 2.0, said diurethane diisocyanate being itself the reaction product of a dicarbinol-terminated polydimethyl polysiloxane having a molecular weight of from about 1000 to about 4000 with substantially a 2:1 stoichiometric excess of an organic diisocyanate, said diurethane diisocyanate being reacted with said resinous polyepoxide in an amount of from about 1.5 moles to about 16 moles per 100 moles of the polyepoxide.

2. A modified polyepoxide as recited in claim 1 in which said polydimethyl polysiloxane has a molecular weight of from about 2200 to about 2500.

3. A modified polyepoxide as recited in claim 2 in which said polyepoxide is a diglycidyl ether of a bisphenol.

4. A modified polyepoxide as recited in claim 3 in which said polyepoxide has a molecular weight of from about 600 to about 800.

5. A polyepoxide coating composition adapted to cure at room temperature and comprising the modified polyepoxide recited in claim 1 in combination with a stoichiometric proportion of amine-functional curing agent in solution in inert organic solvent.

6. A polyepoxide coating composition as recited in claim 5 in which said solvent is butyl acetate.

7. A polyepoxide coating composition as recited in claim 5 in which said amine-functional curing agent is 2-aminethyl 3-aminopropyl trimethoxy silane.

* * * * *